US012725846B2

(12) United States Patent
Shin et al.

(10) Patent No.: US 12,725,846 B2
(45) Date of Patent: Sep. 1, 2026

(54) METHOD AND DEVICE FOR DETECTING ABNORMALITY IN ALIGNMENT OF BATTERY CELL TYPE ELECTRODES

(71) Applicant: SK On Co., Ltd., Seoul (KR)

(72) Inventors: Dong Whan Shin, Daejeon (KR); Kang San Kim, Daejeon (KR); Yun Jae Kim, Daejeon (KR); Seung Han Lee, Daejeon (KR); Hye Ju Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 288 days.

(21) Appl. No.: 18/430,850

(22) Filed: Feb. 2, 2024

(65) Prior Publication Data

US 2024/0265519 A1 Aug. 8, 2024

(30) Foreign Application Priority Data

Feb. 7, 2023 (KR) ........................ 10-2023-0016436
Jul. 11, 2023 (KR) ........................ 10-2023-0089839

(51) Int. Cl.
*H01M 10/48* (2006.01)
*G01N 21/88* (2006.01)
(Continued)

(52) U.S. Cl.
CPC .......... *H01M 10/484* (2013.01); *G01N 21/88* (2013.01); *G06T 7/0004* (2013.01); (Continued)

(58) Field of Classification Search
None
See application file for complete search history.

(56) References Cited

U.S. PATENT DOCUMENTS

2021/0153825 A1* 5/2021 Shizukuishi ............. A61B 6/56
2021/0234207 A1* 7/2021 Chae ...................... G01N 23/04
(Continued)

FOREIGN PATENT DOCUMENTS

CN 113466706 B * 7/2022 ............ G01R 31/36
JP 2001203003 A 7/2001
(Continued)

OTHER PUBLICATIONS

Google Patents Translation of CN-113466706-B, First published Oct. 1, 2021, Date Accessed: Jan. 10, 2026, Available Online at: https://patents.google.com/patent/CN113466706B/en?oq=CN113466706B (Year: 2021).*

*Primary Examiner* — Tahmina N Ansari
(74) *Attorney, Agent, or Firm* — IP & T GROUP LLP

(57) ABSTRACT

According to various embodiments, there may be provides a method for detecting an abnormality in battery cell type electrodes, which includes: acquiring a 3-dimensional image by imaging a specimen including one or more battery cell type electrodes; determining an arrangement state of the electrodes of the specimen by processing the 3-dimensional image as an input to one or more determination models comprising a deep learning-based determination model or a rule-based determination model; and detecting an abnormality in the electrodes of the specimen based on determination results for each of one or more determination models, and a device therefor.

12 Claims, 11 Drawing Sheets

(51) Int. Cl.
*G06T 7/00* (2017.01)
*H01M 10/42* (2006.01)

(52) U.S. Cl.
CPC ....... *H01M 10/4285* (2013.01); *H01M 10/48* (2013.01); *H01M 10/488* (2013.01); *G06T 7/0006* (2013.01); *G06T 2207/10081* (2013.01); *G06T 2207/20081* (2013.01)

(56) References Cited

U.S. PATENT DOCUMENTS

| | | | | |
|---|---|---|---|---|
| 2022/0231300 | A1* | 7/2022 | Yun | H01M 50/534 |
| 2023/0207815 | A1* | 6/2023 | Ai | H01M 50/184<br>429/232 |
| 2024/0354932 | A1* | 10/2024 | Lee | G06T 3/60 |
| 2025/0329900 | A1* | 10/2025 | Wu | H01M 4/666 |

FOREIGN PATENT DOCUMENTS

| | | | |
|---|---|---|---|
| KR | 20200088222 | A | 7/2020 |
| KR | 20220086871 | A | 6/2022 |

* cited by examiner

[FIG. 1]
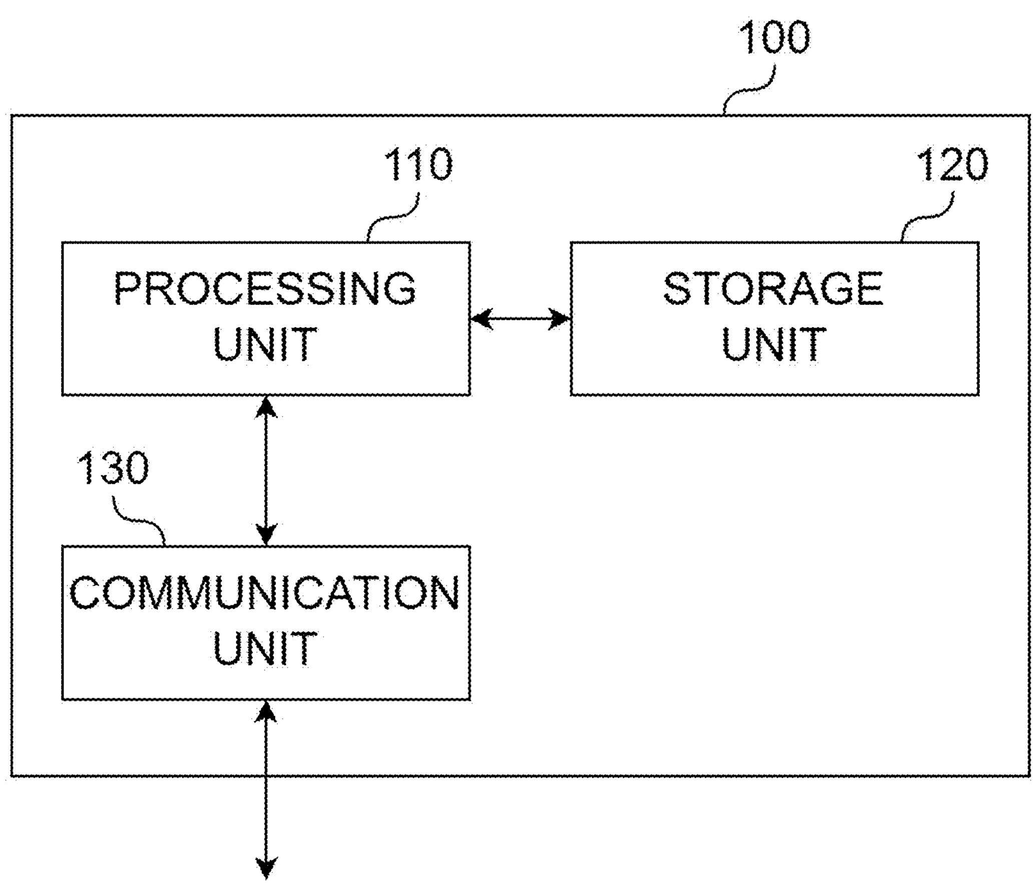

[FIG. 2]
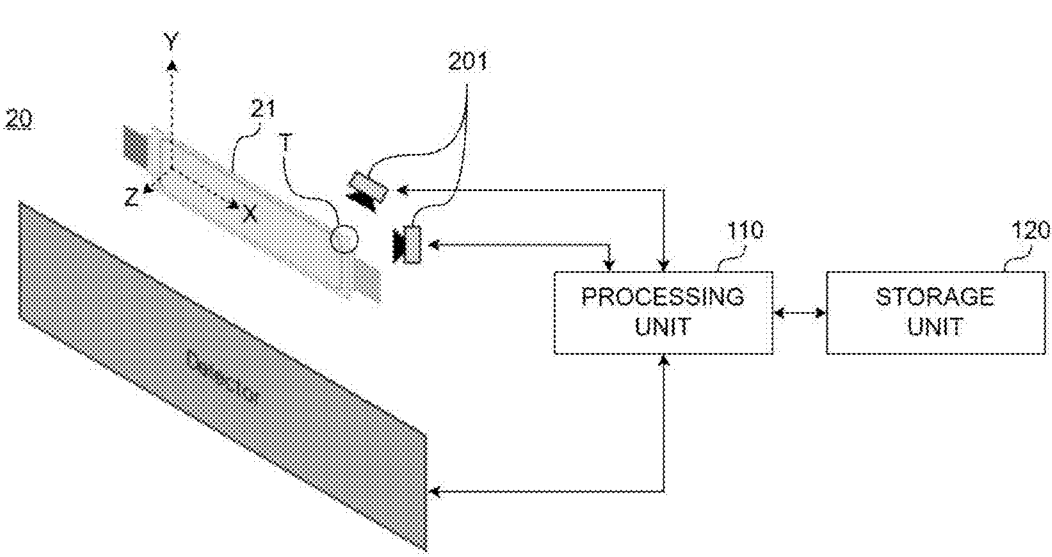

[FIG. 3]
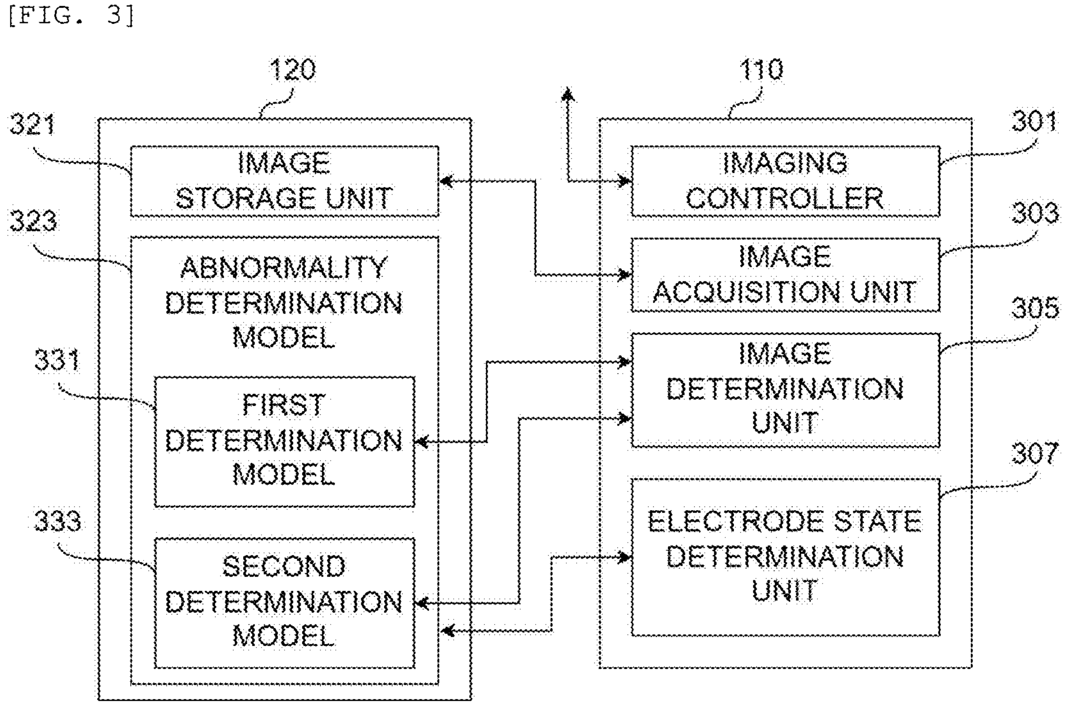

[FIG. 4]
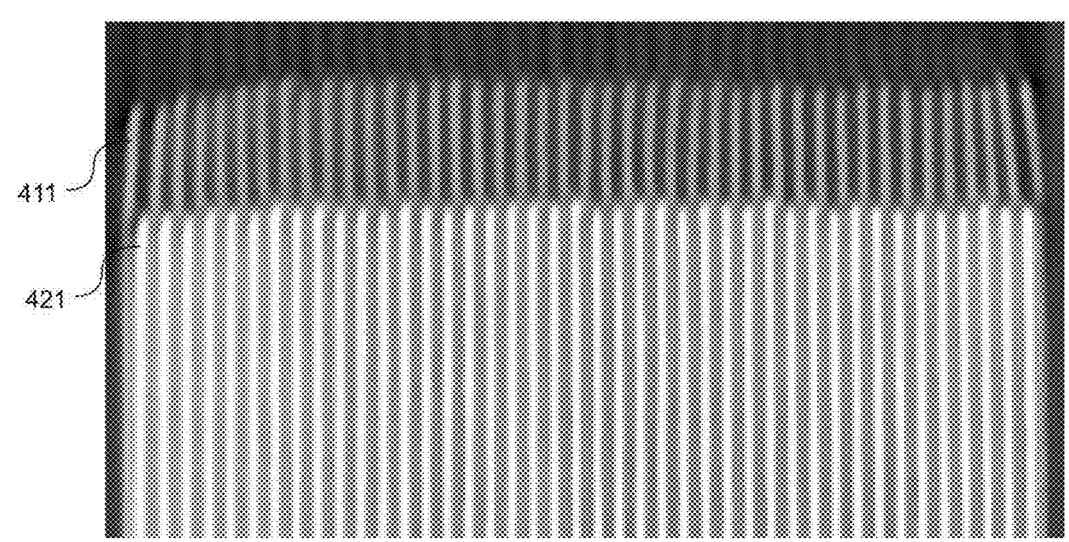

[FIG. 5]
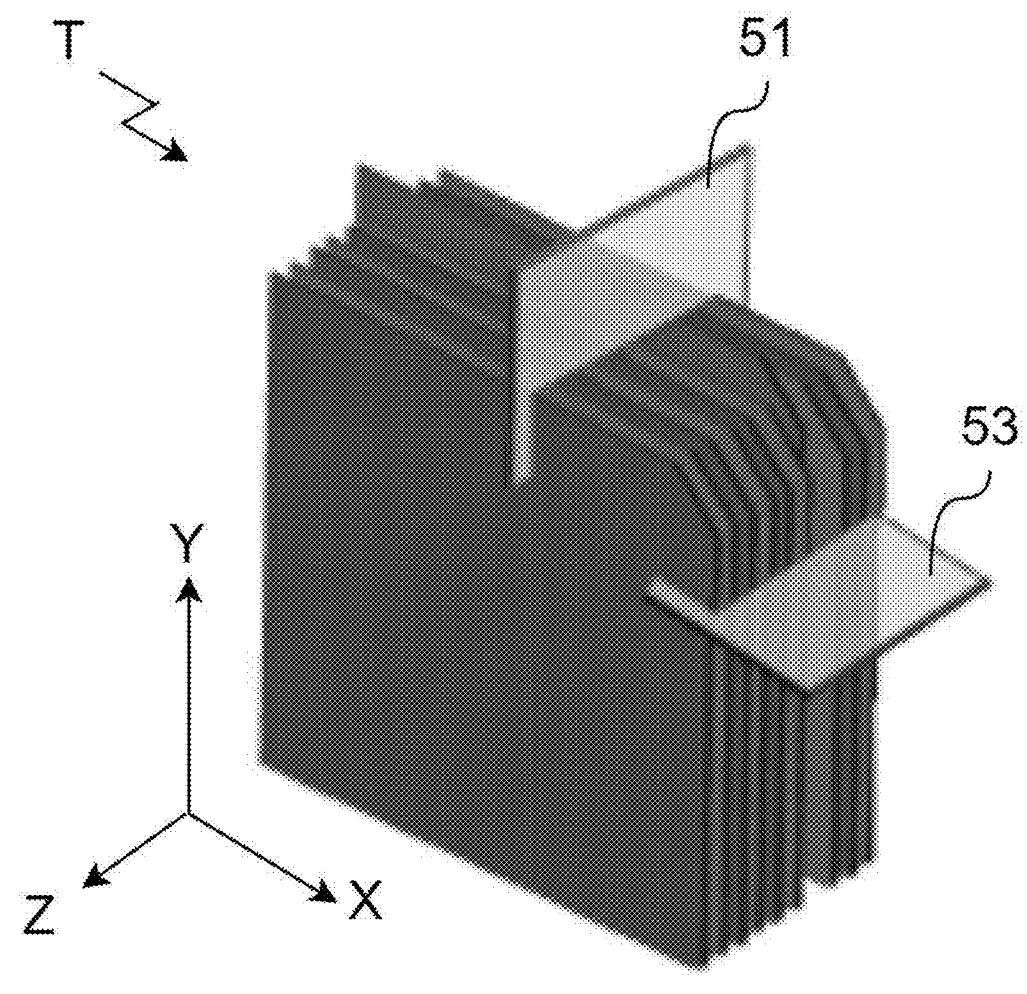

[FIG. 6]
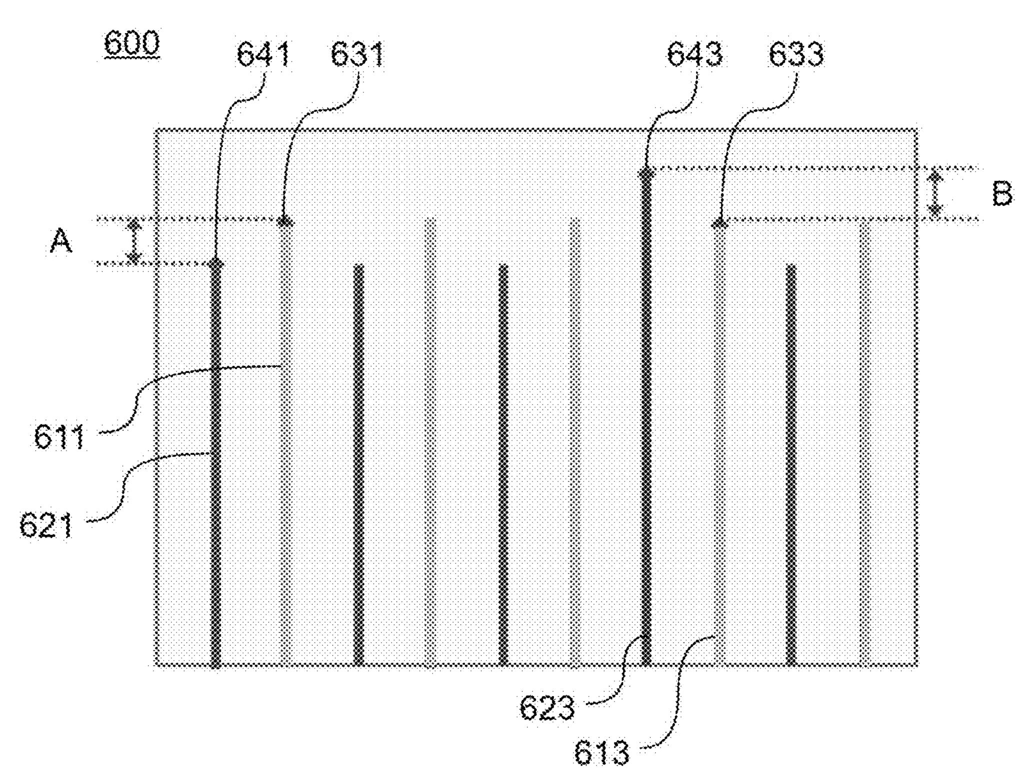

[FIG. 7]
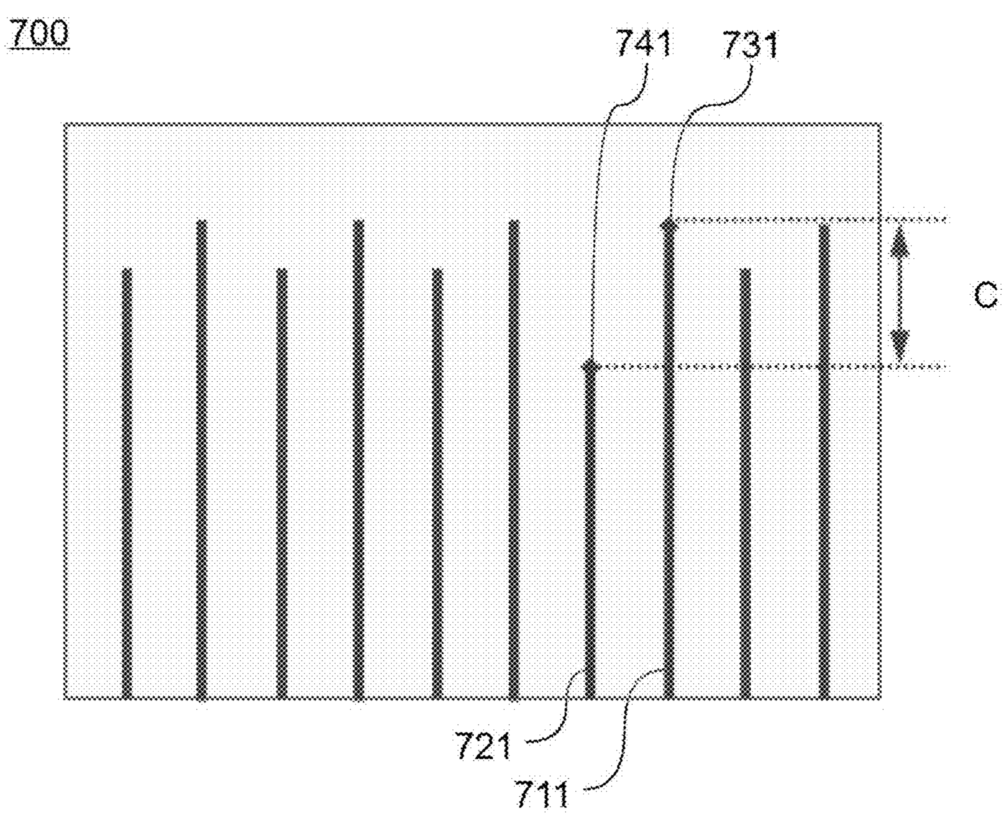

[FIG. 8]
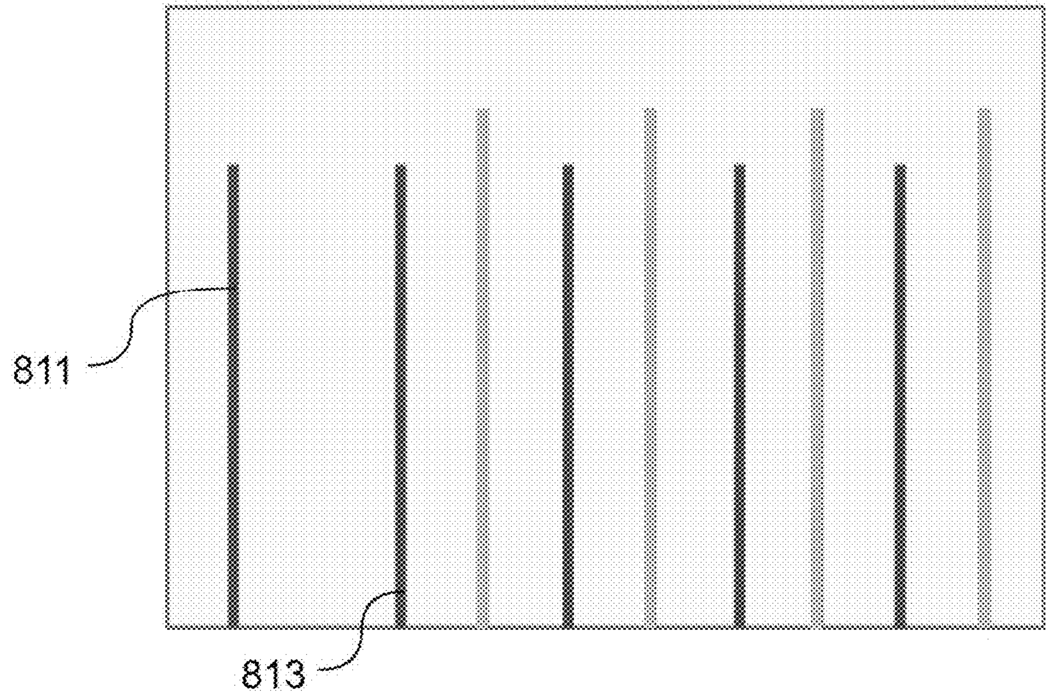

[FIG. 9]
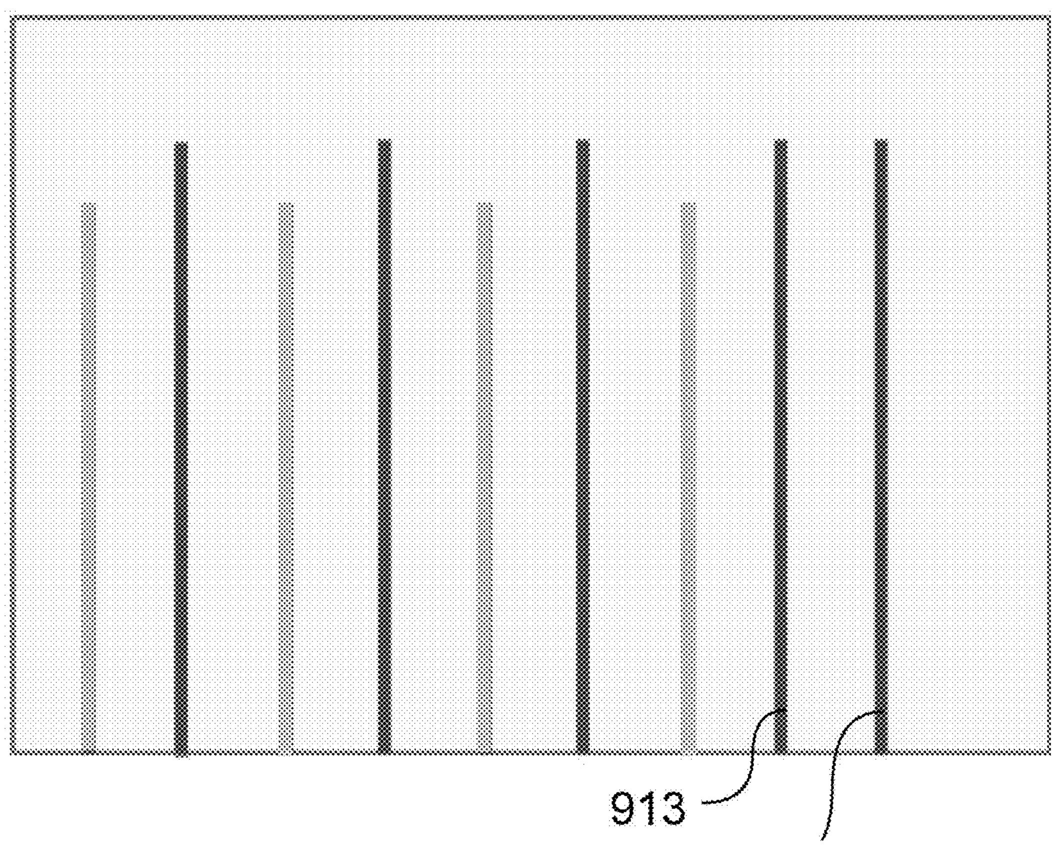

[FIG. 10]
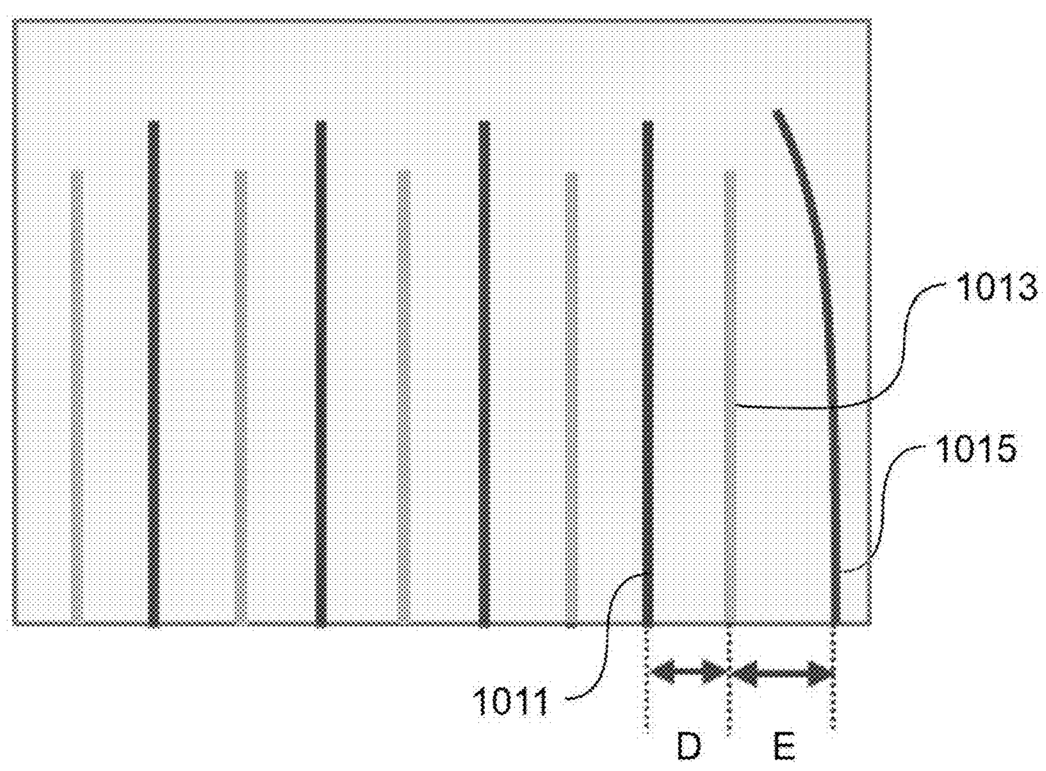

[FIG. 11]
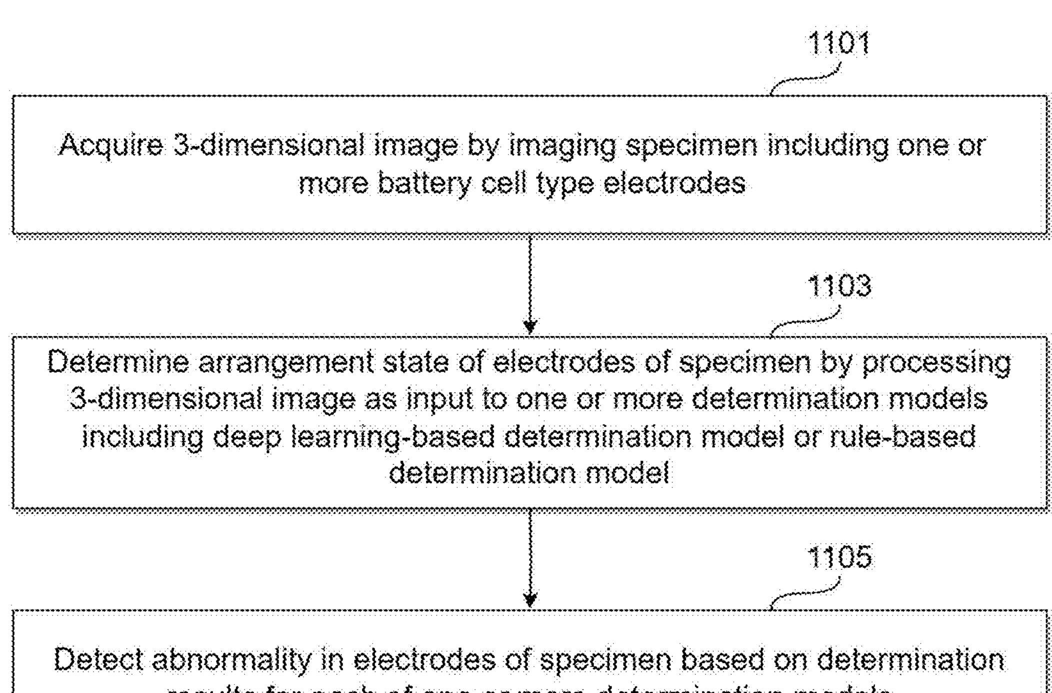

METHOD AND DEVICE FOR DETECTING ABNORMALITY IN ALIGNMENT OF BATTERY CELL TYPE ELECTRODES

CROSS-REFERENCE TO RELATED APPLICATION(S)

This application claims priorities under 35 U.S.C. § 119 to Korean Patent Application No. 10-2023-0016436 filed on Feb. 7, 2023 and Korean Patent Application No. 10-2023-0089839 filed on Jul. 11, 2023. The entire disclosure of each of the foregoing applications is incorporated herein by reference in its entirety.

BACKGROUND OF THE INVENTION

1. Field of the Invention

The present disclosure relates to a method and a device for detecting an abnormality such as a defect in battery cell type electrodes.

2. Description of the Related Art

In general, a battery pack for a vehicle is manufactured by assembling a plurality of cells to form a battery module, and then assembling a plurality of battery modules to prepare a battery pack in a form of being finally mounted on the vehicle. This type of battery module satisfies the required reference voltage and capacity by stacking and adhering a predetermined number of the cells, followed by assembling the same.

However, when stacking the plurality of cells, it is very important to manage cell stacking alignment for ensuring additional component assembly, electrical connection quality between the components, and cooling performance in the post-process.

The cells for constituting the battery module include an anode plate, a cathode plate, and a separation membrane interposed between the anode plate and the cathode plate. The anode plate is provided with an anode lead, and the cathode plate is provided with a cathode lead. The above-described cell is formed in a structure in which the anode plate, the separation membrane, and the cathode plate are sequentially stacked, and then wrapped by a pouch in this state, that is, in the form of a battery cell.

A secondary battery prepared in the above-described form stores and releases an electrical energy through a chemical reaction which occurs at the electrodes during the charging and discharging processes. In this case, if positions of the electrodes are incorrect, problems may occur during the charging and discharging processes. Therefore, exactly measuring and inspecting the positions of the electrodes are one of the important processes to ensure the performance of the secondary battery.

As a device for inspecting whether positions of the electrodes are accurately aligned, there is an inspection device used in the art, which precisely measures the positions of electrodes inside a battery using radiation such as X-rays, and analyzes the measured results to determine the positional accuracy of the electrodes.

In order to inspect the alignment of the electrodes of these battery cells, it is measured and determined whether a gap between the electrodes occurs in an edge region of the battery cell. However, there is a possibility that errors in the alignment inspection may occur only by the measurement of the gap in a diagonal direction of the battery cell.

As a solution to solve this problem, there is a method for inspecting the alignment of electrodes in a battery cell disclosed in the art, which includes: measuring gap dimension data between an anode plate and a cathode plate at two points in an edge region of the battery cell; and precisely calculating a gap between the closest electrode plates by reflecting the measured gap dimension data in the image acquired by X-ray photography, thereby it is possible to determine good or defective products based on alignment information acquired by the calculated gap.

However, this disclosed method still has a problem in that the electrode alignment is determined using tomography images obtained by imaging two different points of the battery cell, and thus cannot detect an abnormality in electrodes occurring in a blind spot.

SUMMARY OF THE INVENTION

It is an object of the present disclosure to provide a method and a device for inspecting an abnormality in battery cell type electrodes, in order to improve reliability of abnormality determination inspection results for the battery cell type electrodes.

The problems to be solved through various embodiments are not limited to the above-described problems, and other problems not described above will be clearly understood by those skilled in the art from the following descriptions.

To achieve the above objects, according to an aspect of the present invention, there is provided a method for detecting an abnormality in battery cell type electrodes, which includes: acquiring a 3-dimensional image by imaging a specimen including one or more battery cell type electrodes; determining an arrangement state of the electrodes of the specimen by processing the 3-dimensional image as an input to one or more determination models comprising a deep learning-based determination model or a rule-based determination model; and detecting an abnormality in the electrodes of the specimen based on determination results for each of one or more determination models.

In the step of acquiring a 3-dimensional image, the 3-dimensional image may be generated by integrating a plurality of images, which are obtained by tomography of cross-sections of the electrodes inside the specimen in a specific region of edges of the specimen, where the electrodes are disposed, by means of CT.

The specific region may include a region where an extension line of a first edge formed in a first axis direction and an extension line of a second edge formed in a second axis direction of the specimen meet, and the plurality of images may include a first tomography image obtained by tomography of a first cross-section of the specimen perpendicular to the first edge in the specific region, and a second tomography image obtained by tomography of a second cross-section of the specimen perpendicular to the second edge in the specific region.

In the step of determining an arrangement state of the electrodes, each of the deep learning-based determination model and the rule-based determination model may be configured to determine an abnormality in the electrodes of the specimen based on at least some of whether an electrode alignment is abnormal, whether an electrode is omitted, whether electrodes are duplicated, and whether an electrode is deformed in the acquired 3-dimensional image.

The determination of whether an electrode alignment is abnormal may be configured to perform according to: in the step of determining an arrangement state of the electrodes, by using the deep learning-based determination model and the rule-based determination model, whether a gap between endpoints of two electrodes disposed in the 3-dimensional image is greater than a preset reference gap; whether a slope formed based on the endpoints of the two electrodes is greater than a preset reference slope; or whether an endpoint of one electrode from the 3-dimensional image is greater than a preset threshold distance from a preset reference point.

The one or more determination models may include: i) two or more of the same deep learning-based determination models; ii) two or more different deep learning-based determination models; or iii) at least one of the deep learning-based determination model and at least one rule-based determination model.

According to another aspect of the present invention, there is provided a device for detecting an abnormality in battery cell type electrodes, which includes: an image acquisition unit configured to acquire a 3-dimensional image by imaging a specimen including one or more battery cell type electrodes; an image determination unit configured to determine an arrangement state of the electrodes of the specimen by processing the 3-dimensional image as an input to one or more determination models comprising a deep learning-based determination model or a rule-based determination model; and an electrode state determination unit configured to detect an abnormality in the electrodes of the specimen based on determination results for each of one or more determination models.

The image acquisition unit may generate the 3-dimensional image by integrating a plurality of images, which are obtained by tomography of cross-sections of the electrodes inside the specimen in a specific region of edges of the specimen, where the electrodes are disposed, by means of CT.

The specific region may include a region where an extension line of a first edge formed in a first axis direction and an extension line of a second edge formed in a second axis direction of the specimen meet, and the image acquisition unit may acquire the plurality of images including a first tomography image obtained by tomography of a first cross-section of the specimen perpendicular to the first edge in the specific region, and a second tomography image obtained by tomography of a second cross-section of the specimen perpendicular to the second edge in the specific region.

Each of the deep learning-based determination model and the rule-based determination model may be configured to determine an abnormality in the electrodes of the specimen based on at least some of whether an electrode alignment is abnormal, whether an electrode is omitted, whether electrodes are duplicated, and whether an electrode is deformed in the acquired 3-dimensional image.

The image determination unit may determine whether the electrode alignment is abnormal according to: by using the deep learning-based determination model and the rule-based determination model, whether a gap between endpoints of two electrodes disposed in the 3-dimensional image is greater than a preset reference gap; whether a slope formed based on the endpoints of the two electrodes is greater than a preset reference slope; or whether an endpoint of one electrode from the 3-dimensional image is greater than a preset threshold distance from a preset reference point.

The one or more determination models may include: i) two or more of the same deep learning-based determination models; ii) two or more different deep learning-based determination models; or iii) at least one of the deep learning-based determination model and at least one rule-based determination model.

According to various embodiments, it is possible to improve the performance of detecting whether electrodes of the specimen are abnormal by providing a device which determines the electrode state of the specimen using tomography images obtained by imaging cut surfaces at various angles with respect to the electrodes of the specimen.

According to various embodiments, it is possible to improve the reliability of the determination model which determines whether the electrodes of the specimen are abnormal by providing an abnormality determination model for a specimen including a plurality of determination models, in such a way that the same deep learning-based determination models are configured in parallel, or the deep learning-based determination model and the rule-based determination model are configured in parallel, and a device based thereon.

According to various embodiments, it is possible to improve the speed and accuracy of determining an abnormality in electrodes of the specimen by providing a device for determining an abnormality in electrodes of a specimen using the plurality of determination models, and thus to reduce the consumption of materials used for defective batteries. Further, it is possible to reduce the manpower required to maintain the production quality of the battery.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram illustrating the configuration of a device according to an embodiment;

FIG. 2 is a view illustrating a schematic configuration of a system including the device according to an embodiment and an electrode inspection device;

FIG. 3 is a block diagram schematically illustrating a processing unit for determining the state of battery cell type electrodes and a storage unit by dividing the configurations depending on the functions thereof in the device according to an embodiment;

FIG. 4 is a diagram illustrating a tomography image of a specimen acquired by an image acquisition unit from a detection unit of the electrode inspection device in the device according to an embodiment;

FIG. 5 is a view schematically illustrating a specific region of the specimen which is imaged by the device according to an embodiment through the electrode inspection device;

FIG. 6 is a view schematically illustrating electrodes in a first plane tomography image acquired for a first cut surface in the specific region of the specimen by the device according to an embodiment;

FIG. 7 is a view schematically illustrating the electrodes in a second plane tomography image acquired for a second cut surface in the specific region of the specimen by the device according to an embodiment;

FIG. 8 is a view schematically illustrating electrodes in a tomography image in which some electrodes are omitted, acquired in the specific region of the specimen by the device according to an embodiment;

FIG. 9 is a view schematically illustrating electrodes in a tomography image in which electrodes are duplicated, acquired in the specific region of the specimen by the device according to an embodiment;

FIG. 10 is a view schematically illustrating electrodes in a tomography image in which an electrode is deformed, acquired in the specific region of the specimen by the device according to an embodiment; and FIG. 11 is a flowchart illustrating procedures of an operation for determining the state of battery cell type electrodes in the device according to an embodiment.

DETAILED DESCRIPTION OF THE INVENTION

Hereinafter, embodiments will be described in detail with reference to the accompanying drawings. However, since various changes can be made in the embodiments, the scope of the patent invention is not limited or restricted by these embodiments. It should be understood that all modifications, equivalents, and alternatives for the embodiments are included in the scope of the present invention.

The terms used in the embodiments are used only for the purpose of describing the invention, and should not be interpreted as limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or combinations thereof.

Unless otherwise defined, all terms including technical or scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, in describing the embodiments with reference to the accompanying drawings, the same reference numerals are denoted to the same components regardless of the number of the drawings, and the same configuration will not be repeatedly described. Further, in description of the embodiments, the publicly known techniques related to the present invention, which are verified to be able to make the purport of the present invention unnecessarily obscure, will not be described in detail.

In addition, in describing components of the embodiment, the terms such as first, second, A, B, (a), (b), and the like may be used. These terms are intended to distinguish the components from other components, and do not limit the nature, sequence or order of the components.

It will be understood that when a component is described to as being "connected", "combined" or "coupled" to another component, the component may be directly connected or coupled the another component, but it may be "connected", "combined" or "coupled" to the another component intervening another component may be present.

In addition, it will be understood that when a component is described as being "connected" or "combined" by communication to another component, that component may be connected or combined by wireless or wired communication to the another component, but it may be "connected" or "combined" to the another component intervening another component may be present.

Components included in one embodiment and components including common functions will be described using the same names in other embodiments. The description given in one embodiment may be applied to other embodiments, and therefore will not be described in detail within the overlapping range, unless there is a description opposite thereto.

The device and/or 'data' processed by the device may be expressed in terms of 'information'. Here, the information may be used as a concept including the data.

The present disclosure relates to a method and a device for detecting an abnormality in battery cell type electrodes, and more specifically, to a method and a device for inspecting an abnormality in electrodes of a battery having a multi-layered structure in which cathode and anode electrodes are stacked.

In this regard, according to an exemplary embodiment, a battery cell may include an electrode assembly in which a cathode, an anode, and a separation membrane are repeatedly disposed, and the electrode assembly may be referred to as a jelly roll (J/R). The battery cell may further include a case for housing the electrode assembly. The case may be a pouch type case, but it is not limited thereto, and may have various shapes such as a prismatic type case or a cylindrical case.

In the present specification, the battery having a multi-layered structure may mean the electrode assembly or an unfinished electrode assembly in which the stacking process for forming the electrode assembly is not completed.

Hereinafter, a method for determining the presence or absence of an abnormality in electrodes formed in the battery in a manufacturing process of a secondary battery, for example, misalignment of the electrodes, electrode omission, electrode duplication, and electrode deformation (e.g., twisting or bending, etc.), and detecting a defect of battery, as well as a device therefor will be described.

For example, an electrode inspection device generates 3-dimensional (3D) images by performing computed tomography (CT) scan of the specimen such as a battery in which electrodes are formed during the manufacturing process, and the device according to the present disclosure may determine whether the electrodes formed in the specimen are abnormal based on the generated 3-dimensional images.

According to various embodiments, an electrode inspection device for performing CT scan of the specimen using X-rays may be described. However, it is not limited thereto, and electrode inspection devices for imaging the specimen in various ways, such as P-ray (gamma-ray) and laser, may be applied to various embodiments.

Hereinafter, preferred embodiments will be described with reference to the accompanying drawings. However, the drawings attached to the present specification serve to further understand the technical idea together with the detailed description, such that the present disclosure should not be construed as being limited only to the illustrations of the drawings.

FIG. 1 is a diagram illustrating the configuration of a device according to an embodiment.

Referring to FIG. 1, a device 100 for detecting an abnormality in battery cell type electrodes may include a processing unit 110, a storage unit 120, and a communication unit 130.

The processing unit 110 may process control commands related to determination of an abnormality in electrodes through at least one program (app, application, tool, plug-in, software, etc., hereinafter referred to as an electrode abnormality determination program). In this case, the electrode abnormality determination program may be stored in the storage unit 120 of the device 100 and/or a storage unit of anther device connected to the device 100.

The processing unit 110 may share data processing and/or processing results with at least one device (e.g., a user device) connected to the device 100 through the electrode abnormality determination program.

Hereinafter, in various embodiments, it may be understood that performing an operation according to the control commands by the device 100 indicates performing an operation designated through at least one program and/or the electrode abnormality determination program related to at least one control command processing of the device 100.

Here, it will be described that the control command processing is performed through the at least one program and/or the electrode abnormality determination program installed in the device 100, but it is not limited thereto, and may be performed through another program or a temporary installation program previously provided and installed in the storage unit 120.

According to an embodiment, the control command processing may be performed through at least a portion of a database provided free of charge or for a fee in an external device connected to the device 100.

The operation of the device 100 is performed based on data processing and device control of the processing unit 110, and the processing unit 110 may also perform functions designated on the basis of the control commands received through an input/output unit (not shown) and/or the communication unit of the device 100.

Further, in processing data acquired through the communication unit 130, the processing unit 110 may process the data based on an identified user. For example, the processing unit 110 may perform an operation according to the control command input by the user device connected to the device through the communication unit 130 and/or the identified user who has been identified through user information.

The storage unit 120 may store various data processed by at least one component (e.g., the processing unit 110 or the communication unit 130) of the device 100. The data may include, for example, a program for control command processing or data processed through the program, and/or input data and output data related thereto.

The storage unit 120 may include an algorithm for control command processing, which includes at least some of an artificial neural network algorithm, a blockchain algorithm, a deep learning algorithm, and a regression analysis algorithm, as well as mechanisms, operators, language models, and big data related thereto.

For example, the storage unit 120 may store at least one abnormality determination model configured to extract preset parameter values from images obtained by imaging a cross-section of the specimen, calculate the extracted parameter values to detect an abnormality in electrodes formed in the specimen. Here, the abnormality determination model may be composed of a neural network model based on deep learning.

The storage unit 120 may include data for confirming and processing the control and operations designated through signals received by each of devices included in the input/output unit.

The operations described as functions of the storage unit 120 are processed by the processing unit 110, and data for processing the related operations, data in process, processed data, preset data, and the like may be stored in the storage unit 120 as a database.

The data stored in the storage unit 120 may be changed, modified, deleted, and/or generated as new data by the processing unit 110 based on user input of the identified user.

The storage unit 120 may store device setting information of the device 100. The device setting information may be setting information on the device 100 and at least some of functions and services provided by the device 100.

The storage unit 120 may store user information (or user account) for at least one user. Here, the user may include an administrator who has control authority over the device 100.

The storage unit 120 may include a volatile memory, a non-volatile memory, and/or a computer-readable recording medium as known in the art. In this case, the computer-readable recording medium may store a computer program for performing an operation to determine an abnormality in electrodes of the battery by the device 100 based on various embodiments.

The communication unit 130 may support establishment of a wired communication channel or establishment of a wireless communication channel between the device 100 and at least one other device (e.g., the user device or a server), and performing communication through the established communication channel.

The communication unit 130 may perform operations such as modulation/demodulation and encryption/decryption, etc., during performing communication, which is obvious to those skilled in the art, and therefore will not be described in more detail.

The communication unit 130 may be operated dependently on or independently from the processing unit 110, and may include one or more communication processors which support wireless communication and/or wired communication.

According to an embodiment, when supporting the wireless communication, the communication unit 130 may include at least some communication modules of wireless communication modules, for example, a cellular communication module, a near field communication module, and a global navigation satellite system (GNSS) communication module.

When supporting the wired communication, the communication unit 130 may include at least some communication modules of wired communication modules, for example, a local area network (LAN) communication module, a power line communication module, or a controller area network (CAN) communication module.

To describe in more detail, the communication unit 130 may communicate with the external device by wired and/or wirelessly through near field communication networks such as Bluetooth, Bluetooth Low Energy (BLE), WiFi, WiFi direct, Infrared Data Association (IrDA), ZigBee, UWB, and radio frequency (RF), and/or far field communication networks such as a cellular network, the Internet or a computer network (e.g., LAN or WAN).

Various types of communication modules constituting the communication unit 130 may be integrated into one component (e.g., a single chip), or may be implemented as a plurality of separate components (e.g., a plurality of chips).

According to various embodiments, the device 100 or the user device may include at least some of functions of all information and communication devices including a mobile communication terminal, a multimedia terminal, a wired terminal, a fixed terminal, an internet protocol (IP) terminal and the like.

The device 100 is a device for control command processing, and may be configured to include at least some functions of a workstation or a large-capacity database, or to be connected thereto through communication.

As the user device connected to the device 100, a mobile phone, a personal computer (PC), a portable multimedia player (PMP), a mobile internet device (MID), a smartphone, a tablet PC, a phablet PC, a laptop computer, and the like may be exemplified.

According to various embodiments, the user device will be described as a device which is connected to the device 100 and communicates therewith. For example, although not illustrated throughout the drawings, the user device may be a smartphone of the user which is connected to the device 100 through wireless communication and transmits user input so that the device 100 processes the operations related to performance determination of the battery cell.

The user device may be connected to the device 100 through at least one program installed therein, or may be connected to the device 100 through at least one web page accessed on online by the device 100. To this end, the device 100 may include at least some of the functions of a terminal for processing operations to determine the performance of the battery cell.

The server is one entity that exists on a network, and performs roles of a web server, a database server, and an application server. According to a preferred embodiment, the server may provide various services to the device 100 and/or the user device based on processing of the device 100.

In this regard, FIG. 2 is a view illustrating a schematic configuration of a system 20 including the device 100 according to an embodiment and a battery cell. In addition, FIG. 3 is a block diagram schematically illustrating the processing unit 110 for determining the state of battery cell type electrodes and the storage unit 120 by dividing the configurations depending on the functions thereof in the device 100 according to an embodiment.

First, referring to FIG. 2, the system 20 may include the device 100 and the battery cell. Here, the system 20 may include an imaging unit for acquiring tomography images of the specimen 21 including the battery cell electrodes through imaging the battery cell. Here, the imaging unit may include a source unit 201 and a detection unit 203.

In addition, referring to FIG. 3, the storage unit 120 of the device 100 may include an image storage unit 321 configured to store tomography images acquired from the electrode inspection device, and store a 3-dimensional image reconstructed from the tomography images, and an abnormality determination model 323 configured to determine the electrode state of the specimen 21 based on the 3-dimensional image.

In addition, the processing unit 110 of the device 100 may include at least one of an imaging controller 301 configured to control the source unit 201 or the detection unit 203 of the electrode inspection device to image the specimen 21, an image acquisition unit 303 configured to acquire a 3-dimensional image from the electrode inspection device, an image determination unit 305 configured to determine the electrode state of the specimen 21 based on the acquired 3-dimensional image, and an electrode state determination unit 307 configured to determine an abnormality in electrodes based on the determination results.

The source unit 201 of the electrode inspection device may include a device for generating and emitting X-rays, and the detection unit 203 may include a device for detecting the X-rays emitted from the source unit 201. In this case, the electrode inspection device may be provided with two or more source units 201 or detection units 203.

The imaging controller 301 controls the source unit 201 to emit X-rays toward the specimen 21 from the source unit 201 in a state where the specimen 21 is disposed between the source unit 201 and the detection unit 203, and may process to generate 2-dimensional tomography images by receiving the emitted X-rays by the detection unit 203.

In this regard, FIG. 4 is a diagram illustrating a tomography image of the specimen acquired by the image acquisition unit 303 from the detection unit 203 of the electrode inspection device in the device 100 according to an embodiment.

Referring to FIG. 4, the tomography image captured through the electrode inspection device may include images obtained by imaging a cross section (or cut surface) to show the displacement and arrangement of the electrodes disposed in the specimen 21.

In this case, the imaging controller 301 may control the electrode inspection device to capture tomography images of two or more different cut surfaces having different imaging angles in a specific region (e.g., specific region T) of the specimen 21.

In this regard, describing with reference to FIG. 5, FIG. 5 is a view schematically illustrating a specific region of the specimen which is imaged by the device according to an embodiment through the electrode inspection device.

Referring to FIGS. 2 to 5, the processing unit 110 may set at least one 3-dimensional coordinate system for the specimen. For example, the processing unit 110 may set a 3-dimensional coordinate system expressed by a longitudinal (or long axis) direction of the specimen 21 disposed in the electrode inspection device as an X-axis (or X-axis direction), a lateral (or miner axis) direction of the specimen 21 as a Y-axis (or Y-axis direction), and a thickness direction of the specimen 21 as a Z-axis (or Z-axis direction).

Here, the electrodes constituting the specimen 21 are configured in a stacked state in the Z-axis direction, and to describe in more detail, may be configured in a way that a positive (+) electrode and an anode (−) electrode are stacked in turn (or alternately). In this case, an electrolyte may be contained between the cathode (+) electrode and the anode (−) electrode.

Hereinafter, in describing various embodiments, one of the cathode (+) and the anode (−) may be referred to as a first polarity, and the other may be referred to as a second polarity.

For this specimen 21, the imaging controller 301 may process to capture tomography images in the preset specific region T of the specimen 21.

Here, the specific region T may include a region including at least one vertex of the specimen 21, a region including two or more edges of the specimen 21, or a region where extension lines of two edges constituting the specimen 21 meet.

Specifically, the specific region may include a region where an extension line of a first edge (e.g., X-axis edge) formed in a first axis direction (e.g., X-axis direction) and an extension line of a second edge (e.g., Y-axis edge) formed in a second axis direction (e.g., Y-axis direction) of the specimen meet.

To describe capturing of the tomography image in more detail, the imaging controller 301 may process to capture a tomography image (ZY-plane tomography image) on a ZY-axis cut surface 51 formed by the Z-axis and Y-axis in the specific region T, or capture a tomography image (ZX-plane tomography image) on a ZX-axis cut surface 53 formed by the Z-axis and the X-axis.

For example, the imaging controller 301 may control the electrode inspection device to image a cut surface of the specimen 21 from an X-axis edge or a Y-axis edge of the specimen 21 toward an inside of the specimen 21 in the specific region T.

To describe in more detail, the imaging controller 301 may control the electrode inspection device to capture the ZX-plane tomography image obtained by imaging the ZX-axis cut surface 53 from the X-axis edge toward the inside of the specimen 21, or the ZY-plane tomography image obtained by imaging the ZY-axis cut surface 51 from the Y-axis edge toward the inside of the specimen 21

Here, the ZX-axis cut surface 53 may be configured to be perpendicular to the Y-axis edge or parallel to the X-axis edge of the specimen 21, which are formed in the specific region T. In addition, the ZY-axis cut surface 51 may be configured to be perpendicular to the X-axis edge or parallel to the Y-axis edge of the specimen 21, which are formed in the specific region T.

Hereinafter, in describing various embodiments, one of the ZY-axis cut surface 51 and the ZX-axis cut surface 53 may be expressed as a first cut surface, and the other may be expressed as a second cut surface.

Likewise, one of the tomography image of the ZY-axis cut surface 51 and the tomography image of the ZX-axis cut surface 53 may be expressed as a first plane tomography image, and the other may be expressed as a second plane tomography image.

Again referring to FIG. 4, FIG. 4 may show the ZY-plane tomography image obtained by imaging the ZY-axis cut surface 51 of the specimen 21, or the ZX-plane tomography image obtained by imaging the ZX-axis cut surface 53 of the specimen 21.

As described above, from the tomography image 400 for the specimen 21, it can be seen that electrodes 411 having first polarities and electrodes 421 having second polarities are alternately stacked.

As described above, the imaging controller 301 may process to capture at least one first plane tomography image and at least one second plane tomography image in the specific region T of the specimen. However, it is not limited thereto, and the imaging controller 301 may process to capture at least one tomography image on at least one plane between the ZX-plane and the ZY-plane in the specific region T of the specimen.

Hereinafter, in describing various embodiments, the invention will be described using a tomography image of the first plane or the second plane, but it is not limited thereto, and a tomography image of at least one plane between the first plane and the second plane may also be applied to various embodiments.

In addition, according to the above description, an example of capturing the tomography images in the specific region T of the specimen 21 has been described, but it is not limited thereto, and tomography images captured in other regions of the specimen 21 or captured throughout the specimen 21 may also be applied to various embodiments.

In addition, preferably, the imaging controller 301 may be configured to capture a tomography image of the specimen 21 on a cut surface of the specimen 21 including the Z-axis direction as described above.

However, it is not limited thereto, and the imaging controller 301 may be configured to capture a tomography image of the specimen 21 on a cut surface including at least one of the Z-axis, X-axis and Y-axis.

In this case, the source unit 201 or the detection unit 203 constituting the electrode inspection device is configured to move about the specimen, and the movement of the source unit 201 or the detection unit 203 may be controlled by the imaging controller 301.

The image acquisition unit 303 may acquire at least one first plane tomography image and at least one second plane tomography image generated by the detection unit 203. The image acquisition unit 303 may store the acquired at least one first plane tomography image and at least one second plane tomography image in the image storage unit 221.

The image acquisition unit 303 may generate a 3-dimensional (3D) image (or 3-dimensional CT image) corresponding to the specimen 21 by reconstructing a plurality of the acquired tomography images.

For example, the image acquisition unit 303 may generate a 3-dimensional image in the specific region T of the specimen 21 based on the acquired at least one first plane tomography image and at least one second plane tomography image.

Here, the image acquisition unit 303 may acquire tomography images in not only the specific region but also in at least one other region, and may generate a 3-dimensional image in the at least one other region of the specimen 21 based on the tomography images.

In this case, the image acquisition unit 303 may generate a 3-dimensional image of the specimen 21 by reconstructing the tomography images.

The image determination unit 305 may perform an alignment inspection on the electrodes included in the specimen 21 based on the 3-dimensional image of the specimen 21. To this end, the image acquisition unit 303 may acquire (or extract) tomography images of at least two planes from the 3-dimensional image of the specimen 21.

For example, the image acquisition unit 303 may acquire at least one tomography image of the first plane and at least one tomography image of the second plane from the 3-dimensional image of the specimen 21.

To describe in more detail, the image acquisition unit 303 may extract at least one tomography image of the ZX-plane and at least one tomography image of the ZY-plane in the specific region T from the 3-dimensional image of the specimen.

Here, the image determination unit 305 may extract one or more parameter values for determining the electrode state of the specimen 21 from the acquired tomography images based on the abnormality determination model 323, and determine the electrode state based on the extracted parameter values.

As shown in FIG. 3, the abnormality determination model 323 for this purpose may include, one or more determination models (e.g., a first determination model 331 or a second determination model 333), and more specifically, two or more determination models (e.g., the first determination model 331 and the second determination model 333).

In addition, the abnormality determination model 323 may include at least one neural network model pre-trained based on deep learning as the determination model (hereinafter, deep learning-based determination model). In addition, the abnormality determination model 323 may include a rule-based determination model.

In this state, the deep learning-based determination model or rule-based determination model may be set or trained to extract preset parameters and parameter values for the input tomography images.

Hereinafter, various examples in which the image determination unit 305 extracts the preset parameters and parameter values from the tomography images through the deep learning-based determination model or the rule-based determination model will be described.

In the examples below, it will be described that the image determination unit 305 extracts the preset parameters and parameter values from the tomography images through the deep learning-based determination model or the rule-based determination model.

In this state, the deep learning-based determination model or the rule-based determination model may be configured or trained to extract the corresponding parameters and parameter values based on the input tomography images.

For example, the deep learning-based determination model or the rule-based determination model may be configured to extract electrodes and positions of the electrodes from the tomography images. In this case, the deep learning-based determination model or the rule-based determination model may be configured to extract the electrodes by distinguishing between the cathode electrode (or cathode layer, hereinafter, cathode) and the anode electrode (or anode layer, hereinafter, anode).

In addition, the deep learning-based determination model or the rule-based determination model may be configured to identify the electrodes extracted from the tomography images. For example, the deep learning-based determination model or the rule-based determination model may be configured to extract electrodes from the first plane tomography image and the second plane tomography image, and match the same electrodes with each other based on the positions of the electrodes among the electrodes extracted from the first plane tomography image and the second plane tomography image.

In this regard, referring to FIGS. 6 and 7, FIG. 6 is a view schematically illustrating electrodes in the first plane tomography image acquired for the first cut surface in the specific region of the specimen by the device according to an embodiment, and FIG. 7 is a view schematically illustrating the electrodes in the second plane tomography image acquired for the second cut surface in the specific region of the specimen by the device according to an embodiment.

Referring to FIGS. 6 and 7, the image determination unit 305 may process a first plane tomography image 600 (e.g., the ZX-plane tomography image) for the first cut surface in the specific region T of the specimen 21 and a second plane tomography image 700 (e.g., the ZY-plane tomography image) for the second cut surface as an input to the deep learning-based determination model or the rule-based determination model, so as to determine the electrode state of the specimen 21.

In this case, the deep learning-based determination model or the rule-based determination model may be configured to extract at least one electrode (e.g., an electrode 613 and an electrode 623) from the first plane tomography image, and extract at least one electrode (e.g., an electrode 711 and an electrode 721) from the second plane tomography image.

The image determination unit 305 may match the electrodes 613 and 711 as the same electrode, and match the electrodes 623 and 721 as the same electrode through the deep learning-based determination model or the rule-based determination model.

For another example, the deep learning-based determination model or the rule-based determination model may be configured to extract endpoint positions for each of the electrodes from the tomography images. To describe with reference to FIG. 6, when it is configured to extract electrodes including the electrode 611, the electrode 613, the electrode 621 and the electrode 623 from the first plane tomography image 600, the deep learning-based determination model or the rule-based determination model may be configured to extract endpoint positions of the electrodes, including an electrode endpoint 631, an electrode endpoint 641, an electrode endpoint 643 and an electrode endpoint 633 for each of the extracted electrodes.

In addition, the deep learning-based determination model or the rule-based determination model may be configured to calculate a gap between adjacent electrode endpoints based on the extracted electrode endpoints. In this case, the deep learning-based determination model or the rule-based determination model may be configured to calculate a gap between adjacent electrode endpoints in each of the first plane tomography image and the second plane tomography image.

Here, as shown in FIG. 6 or 7, the gap between the electrode endpoints may refer to a gap between endpoints in the X-axis or Y-axis direction.

First, to describe with reference to FIG. 6, the deep learning-based determination model or the rule-based determination model may be configured to calculate a gap between two electrode endpoints adjacent to each other from the electrodes and the electrode endpoints acquired in the first plane tomography image, such as a gap A between the electrode endpoint 631 and the electrode endpoint 641 for the electrode 611 and the electrode 621, and a gap B between the electrode endpoint 633 and the electrode endpoint 643 for the electrode 613 and the electrode 623.

Likewise, to describe with reference to FIG. 7, the deep learning-based determination model or the rule-based determination model may be configured to calculate a gap between two electrode endpoints adjacent to each other from the electrodes and the electrode endpoints acquired from the second plane tomography image, such as a gap C between an electrode endpoint 731 and an electrode endpoint 741 for the electrode 711 and the electrode 721.

Here, the gap between the adjacent electrode endpoints may be a value obtained by subtracting a second electrode endpoint position from a first electrode endpoint position, or may be a value obtained by subtracting the first electrode endpoint position from the second electrode endpoint position.

The deep learning-based determination model or the rule-based determination model may be configured to determine whether the calculated gap (value) between two electrode endpoints satisfies a preset endpoint gap reference value (or reference gap). Here, the endpoint reference gap may be set as a value, or may be set as a range (e.g., endpoint gap reference range).

Here, the deep learning-based determination model or the rule-based determination model may be configured to calculate the gap between the adjacent electrode endpoints as a scalar value or vector value, and based on this, the endpoint reference gap may be set as the scalar value or vector value.

When the calculated gap between two electrode endpoints satisfies a condition of the preset endpoint reference gap (or reference range), the deep learning-based determination model or the rule-based determination model may determine that the corresponding electrodes are in a normal state, and when it does not satisfy the condition, determine that the corresponding electrodes are in an abnormal state.

According to an embodiment, when the endpoint reference gap is set, and if the calculated gap between two electrode endpoints is greater (or not less) than the endpoint reference gap, the deep learning-based determination model or the rule-based determination model may be configured to determine that the corresponding electrodes are in a normal state.

However, it is not limited thereto, and if the calculated gap between two electrode endpoints is smaller (or not more) than the endpoint reference gap, the deep learning-based determination model or the rule-based determination model may be configured to determine that the corresponding electrodes are in a normal state.

According to various embodiments, when the endpoint gap reference range is set, and if the calculated gap between two electrode endpoints is a value within the endpoint gap reference range, the deep learning-based determination model or the rule-based determination model may be configured to determine that the corresponding electrodes are in a normal state.

However, it is not limited thereto, and if the calculated gap between two electrode endpoints is a value out of the endpoint gap reference range, the deep learning-based determination model or the rule-based determination model may be configured to determine that the corresponding electrodes are in a normal state.

In describing various examples, the positions of electrodes or the endpoint positions for each electrode may be determined as a vector value for a preset 3-dimensional coordinate system.

According to various embodiments, two electrode endpoints adjacent to each other are described as an example of electrodes having different polarities, but it is not limited thereto, and in the case of two electrode endpoints having the same polarity (e.g., two adjacent cathode endpoints, or two adjacent anode endpoints), the deep learning-based determination model or the rule-based determination model may also be configured to determine the electrode state in the same or similar manner as the above-described embodiments. In this case, even if an anode exists between two cathodes or a cathode exists between two anodes, it may be expressed as adjacent cathodes and adjacent anodes.

As another example, the deep learning-based determination model or the rule-based determination model may be configured to calculate a slope (or angle, hereinafter slope) based on two electrode endpoints from the tomography images (e.g., the ZX-plane tomography images or ZY-plane tomography images).

In this case, the deep learning-based determination model or the rule-based determination model may be configured to calculate the slope based on two electrode endpoints in each of the first plane tomography image and the second plane tomography image.

Here, the deep learning-based determination model or the rule-based determination model may be set to calculate the slope or angle based on two electrode endpoints with respect to the preset 3-dimensional coordinate axis.

The deep learning-based determination model or the rule-based determination model may be configured to determine whether the calculated slope (or angle) based on two electrode endpoints satisfies a preset endpoint reference slope (or reference slope). Here, the endpoint reference slope may be set as a value, or may be set as a range (e.g., endpoint slope reference range).

Here, the deep learning-based determination model or the rule-based determination model may be configured to calculate the slope based on adjacent electrode endpoints as a scalar value or vector value, and based on this, the endpoint reference gap may be set as a scalar value or vector value.

When the calculated slope based on two electrode endpoints satisfies a condition of the preset endpoint reference slope (or reference range), the deep learning-based determination model or the rule-based determination model may determine that the corresponding electrodes are in a normal state, and when it does not satisfy the condition, determine that the corresponding electrodes are in an abnormal state.

According to an embodiment, when the endpoint reference slope is set, and if the calculated slope based on two electrode endpoints is greater (or not less) than the endpoint reference slope, the deep learning-based determination model or the rule-based determination model may be configured to determine that the corresponding electrodes are in a normal state.

However, it is not limited thereto, and if the calculated slope based on two electrode endpoints is smaller (or not more) than the endpoint reference slope, the deep learning-based determination model or the rule-based determination model may be configured to determine that the corresponding electrodes are in a normal state.

According to various embodiments, when the endpoint slope reference range is set, and if the calculated slope based on two electrode endpoints is within the endpoint slope reference range, the deep learning-based determination model or the rule-based determination model may be configured to determine that the corresponding electrodes are in a normal state.

However, it is not limited thereto, and if the calculated slope based on two electrode endpoints is out of the endpoint slope reference range, the deep learning-based determination model or the rule-based determination model may be configured to determine that the corresponding electrodes are in a normal state.

Here, the slope based on two electrode endpoints may be a slope based on electrodes having different polarities adjacent to each other or two electrode endpoints having the same polarity (e.g., two adjacent cathode endpoints, or two adjacent anode endpoints). In addition, the slope based on two electrode endpoints may be a slope based on two electrode endpoints which are not adjacent to each other.

In addition, the deep learning-based determination model or the rule-based determination model is not limited to the slope based on two electrode endpoints, and based on an average slope for the electrodes included in the plane tomography image, it may be configured to determine the electrode state in the same or similar manner as the above-described embodiments.

The deep learning-based determination model or the rule-based determination model may be configured to determine whether there is an electrode corresponding to a position greater than a preset threshold length from a preset reference point based on the endpoint position of the respective electrodes extracted from the plane (e.g., the ZX-plane or ZY-plane) tomography image.

In this case, when there is an electrode at the position greater than the preset threshold length from the preset reference point among the electrodes extracted from the plane tomography image, the deep learning-based determination model or the rule-based determination model may determine that the corresponding electrode is in an abnormal state.

For example, the deep learning-based determination model or the rule-based determination model may calculate a length (e.g., an electrode length) between the preset reference point and the electrode endpoint for each of the electrodes extracted from the plane tomography image, and if the calculated length of the electrode is greater than the preset critical length, it may be determined that the corresponding electrode is in an abnormal state.

Here, the preset reference point may be determined for the X-axis or Y-axis direction in the preset 3-dimensional coordinate system.

As another example, the deep learning-based determination model or the rule-based determination model may be configured to determine whether there is electrode omission or electrode duplication from the tomography images. In this regard, it will be described with reference to FIGS. 8 and 9.

FIG. 8 is a view schematically illustrating electrodes in a tomography image in which some electrodes are omitted, acquired in the specific region of the specimen by the device according to an embodiment, and FIG. 9 is a view schematically illustrating electrodes in a tomography image in which electrodes are duplicated, acquired in the specific region of the specimen by the device according to an embodiment.

According to the above description, the deep learning-based determination model or the rule-based determination model may be configured to extract electrodes from the acquired tomography image and distinguish between the cathode and anode electrodes.

Based on this, the deep learning-based determination model or the rule-based determination model may be configured to extract electrodes from the acquired tomography image (e.g., the first plane tomography image or second plane tomography image), determine whether the cathode and anode are disposed alternately, and detect an omitted electrode between the alternately disposed electrodes.

Referring to FIG. 8, the deep learning-based determination model or the rule-based determination model may be configured to extract electrodes from an input tomography image 800, identify the cathode and anode of the extracted electrodes, and detect a state where an electrode (e.g., cathode) having a different polarity is omitted between an electrode 811 (e.g., anode) and an electrode 813 (e.g., anode) based on the identified cathodes and anodes.

Similarly, the deep learning-based determination model or the rule-based determination model may be configured to extract electrodes from the acquired tomography image (e.g., first plane tomography image or second plane tomography image), determine whether the cathode and anode are alternately disposed, and detect a state where electrodes having the same polarity are duplicated.

Referring to FIG. 9, the deep learning-based determination model or the rule-based determination model may be configured to extract electrodes from an input tomography image 900, identify the cathode and anode of the extracted electrode, and detect a state where electrodes having the same polarity are duplicated caused by an electrode 913 (e.g., cathode) which is disposed at a position where an electrode (e.g., anode) having a different polarity should be disposed adjacent to an electrode 911 (e.g., cathode) based on the identified cathodes and anodes.

As another example, the deep learning-based determination model or the rule-based determination model may be configured to determine whether the electrode is deformed from the tomography images. In this regard, FIG. 10 is a view schematically illustrating electrodes in a tomography image in which an electrode is deformed, acquired in the specific region of the specimen by the device according to an embodiment.

Referring to FIG. 10, the deep learning-based determination model or the rule-based determination model may be configured to extract electrodes from the input tomography image and calculate a gap between the electrodes. The deep learning-based determination model or the rule-based determination model may be configured to determine whether the calculated gap (value) between two electrodes (two adjacent electrodes) satisfies the preset electrode gap reference value. Here, the electrode gap reference value may be set as a value, or may be set as a range (e.g., electrode gap reference range).

When the calculated gap between two electrode endpoints satisfies a condition of the preset endpoint reference gap (or reference range), the deep learning-based determination model or the rule-based determination model may determine that the corresponding electrodes are in a normal state, and when it does not satisfy the condition, determine that the corresponding electrodes are in an abnormal state.

According to an embodiment, when the electrode gap reference value is set, and if the calculated gap between the two electrodes 1011 and 1013 is smaller (or not more) than the electrode gap reference value, the deep learning-based determination model or the rule-based determination model may be configured to determine that the corresponding electrodes 1011 and 1013 are in a normal state.

On the other hand, if the calculated gap between the two electrodes 1013 and 1015 is greater (or not less) than the electrode gap reference value, the deep learning-based determination model or the rule-based determination model may be configured to determine that at least one electrode 1015 of the corresponding electrodes 1013 and 1015 is in an abnormal state.

Again returning to FIG. 3, according to the above description, it has been described that the abnormality determination model 323 includes two or more determination models.

In this case, the abnormality determination model 323 may include two or more deep learning-based determination models, or include at least one deep learning-based determination model and at least one rule-based determination model.

Here, when the abnormality determination model 323 includes two or more deep learning-based determination models, it may include a plurality of the same deep learning-based determination models, or include different deep learning-based determination models.

Here, if the abnormality determination model 323 includes the plurality of the same deep learning-based determination models, it includes only one corresponding deep learning-based determination model, and may be configured to operate in parallel as the designated number of times (the number of included determination models). That is, referring to FIG. 3, according to a first embodiment, the first determination model 331 and the second determination model 333 constituting the abnormality determination model 323 may include the same deep learning-based determination models. According to a second embodiment, the abnormality determination model 323 may include different deep learning-based determination models, for example, a first deep learning-based determination model 331 and a second deep learning-based determination model 333.

According to a third embodiment, the abnormality determination model 323 may include the deep learning-based determination model 331 and a rule-based determination model 333.

Referring to FIG. 3, it is illustrated that the abnormality determination model 323 includes two determination models 331 and 333, but it is not limited thereto, and may include three or more determination models.

The image determination unit 305 may process at least one first tomography image and at least one second tomography image acquired for the specimen 21 as an input to each of the determination models constituting the abnormality determination model 323, and acquire state determination results of the specimen 21 for each of the determination models.

The image determination unit 305 may acquire the state determination results of the specimen 21 as a normal state or an abnormal state. In this case, when the abnormal state of the specimen 21 is acquired, the image determination unit 305 may acquire information on at least some of categories, parameters, and parameter values of the specimen 21 that has been determined in the abnormal state.

The electrode state determination unit 307 may determine a final state of the electrodes of the specimen 21 based on the electrode determination results of the specimen 21 through each of the determination models constituting the abnormality determination model 323.

To describe with reference to FIG. 3, the electrode state determination unit 307 may collect an abnormality determination result of the electrodes of the specimen 21 using the first determination model 331 and an abnormality determination result of the electrode of the specimen 21 using the second determination model 333 to determine the electrode state of the specimen 21.

For example, when the abnormality determination result in the electrodes of the specimen 21 using the first determination model 331 is normal, and the abnormality determination result in the electrodes of the specimen 21 using the second determination model 333 is normal, the electrode state determination unit 307 may determine that the electrodes of the specimen 21 are in a normal state.

For another example, when the abnormality determination result in the electrodes of the specimen 21 using the first determination model 331 is normal, and the abnormality determination result in the electrodes of the specimen 21 using the second determination model 333 is abnormal, the electrode state determination unit 307 may determine that the electrodes of the specimen 21 are in an abnormal state.

Likewise, when the abnormality determination result in the electrodes of the specimen 21 using the first determination model 331 is abnormal, and the abnormality determination result in the electrodes of the specimen 21 using the second determination model 333 is normal, the electrode state determination unit 307 may determine that the electrodes of the specimen 21 are in an abnormal state.

As described above, the electrode state determination unit 307 may acquire abnormality determination results of the electrodes of the specimen 21 for each of the determination models constituting the abnormality determination model 323.

When all abnormality determination results in the electrodes of the specimen 21 using the determination models constituting the abnormality determination model 323 are normal, the electrode state determination unit 307 may determine that the electrodes of the specimen 21 are in a normal state, and when all abnormality determination results in the electrodes of the specimen 21 are abnormal, determine that the electrodes of the specimen 21 are in an abnormal state.

When it is determined that the electrodes of the specimen 21 are in the abnormal state, the electrode state determination unit 307 may acquire information on at least some of the categories, parameters, and parameter values of the specimen 21 that has been detected in the abnormal state from the determination model by which the abnormal state has determined.

In addition, when it is determined that the electrodes of the specimen 21 are in the abnormal state, the electrode state determination unit 307 may acquire at least one tomography image used to detect the abnormal state.

In addition, the electrode state determination unit 307 may label at least one tomography image used to detect the abnormal state with the information on at least some of the categories, parameters, and parameter values of the specimen 21 that has been determined in the abnormal state, or a bounding box based thereon.

To describe in more detail, the electrode state determination unit 307 may display the electrode that has been determined in the abnormal state on at least one tomography image by the bounding box, and may label it with a category of misalignment, electrode omission, electrode duplication or electrode deformation as a cause that has determined the abnormality in the corresponding electrodes Here, the electrode state determination unit 307 may visualize and label information on the abnormal state of the electrodes of the specimen 21 based on at least some models of KDE, OC-SVM, GMM, K-means cluster, t-SNE, and GradCAM.

When it is determined that the electrodes of the specimen 21 are in a normal state, the electrode state determination unit 307 may process to perform an abnormality determination on the electrodes of the next specimen.

On the other hand, when it is determined that the electrodes of the specimen 21 are in an abnormal state, the electrode state determination unit 307 may output the abnormal state of the specimen 21. For example, the electrode state determination unit 307 may process to output a preset notification through the device 100 or an output unit (e.g., a display or speaker) connected to the device 100, or transmit the abnormal state of the specimen 21 or at least one tomography image on which the abnormal state is displayed to a preset user device.

When the abnormality determination results of the electrodes of the specimen 21 using the determination models constituting the abnormality determination model 323 include both the normal and abnormal states, the electrode state determination unit 307 may determine (reinspection) to perform again the abnormality (to perform a reinspection) on the electrodes of the specimen 21.

When determining a reinspection of the specimen 21 by the electrode state determination unit 307, the image determination unit 305 may perform again the abnormality in the electrodes of the specimen 21. Here, when performing the reinspection, the image determination unit 305 may perform a reinspection of the specimen 21 using the same existing abnormality determination model 323.

However, the image determination unit 305 may perform a reinspection of the specimen 21 by changing one or more determination models included in the abnormality determination model 323.

For example, if the determination model by which the abnormal state has determined is the deep learning-based determination model of the determination models constituting the abnormality determination model 323, the image determination unit 305 may perform the reinspection of the specimen 21 by changing the corresponding determination model to another deep learning-based determination model stored in the storage unit 120.

In addition, if the determination model by which the abnormal state has determined is the rule-based determination model of the determination models constituting the abnormality determination model 323, the image determination unit 305 may perform the reinspection of the specimen 21 by changing the corresponding determination model to another rule-based determination model stored in the storage unit 120.

In addition, the image determination unit 305 may perform a reinspection of the specimen 21 by changing all of the determination models constituting the abnormality determination model 323 to a new determination model. In this case, the image determination unit 305 may change the deep learning-based determination model to another deep learning-based determination model stored in the storage unit 120, and change the rule-based determination model to another rule-based determination model stored in the storage unit 120.

Thereafter, the electrode state determination unit 307 may acquire abnormality determination results for the reinspection of the specimen 21 for each of the determination models constituting the abnormality determination model 323.

When all abnormality determination results of reinspection are normal, the electrode state determination unit 307 may determine that the electrodes of the specimen 21 are in a normal state, and when at least one abnormality determination result is abnormal, determine that the electrodes of the specimen 21 are in an abnormal state.

Hereinafter, procedures of an operation for determining the battery electrode state by the device 100 and the electrode inspection device will be described with reference to FIG. 11. FIG. 11 is a flowchart illustrating the procedures of the operation for determining the state of battery cell type electrodes in the device according to an embodiment.

In step 1101, the image acquisition unit 303 may acquire a 3-dimensional image by imaging a specimen including one or more battery cell type electrodes.

In this case, the 3-dimensional image may be generated by integrating a plurality of images, which are obtained by tomography of cross-sections of the electrodes inside the specimen in a specific region of edges of the specimen, where the electrodes are disposed, by means of CT.

To this end, as described above, the imaging controller 301 may control the electrode inspection device to capture tomography images on two or more planes among at least one tomography image on the ZX-plane, at least one tomography image on the ZY-plane, and a tomography image on at least one other plane in the specific region T including the vertex of the specimen 21.

Here, the tomography images may be composed of tomography images captured to include the endpoints of the electrodes of the specimen 21.

The image acquisition unit 303 may acquire tomography images obtained by imaging the specimen 21 from the electrode inspection device, and generate a 3-dimensional image of at least a portion of the specimen 21 based on the acquired tomography images.

In step 1103, the image determination unit 305 may determine an arrangement state of the electrodes of the specimen by processing the 3-dimensional image as an input to one or more determination models including the deep learning-based determination model or the rule-based determination model.

Hereinafter, various embodiments, an example will be described based on one or more determination models, but it is not limited thereto, and various embodiments will be described by applying two or more determination models.

The image acquisition unit 303 may acquire tomography images of two or more planes from the 3-dimensional image of the specimen 21. In this case, the image acquisition unit 303 may acquire tomography images to include a plurality of electrodes constituting the specimen 21 and endpoints of the electrodes from the 3-dimensional image.

For example, the image acquisition unit 303 may acquire at least one ZX-plane tomography image and at least one ZY-plane tomography image including a plurality of electrodes and the endpoints of the electrodes.

The image determination unit 305 may process the acquired tomography images (e.g., at least one ZX-plane tomography image and at least one ZY-plane tomography image) as an input to each of one or more determination models, and may determine the electrode state (e.g., normal state or abnormal state) of the specimen 21 from each of one or more determination models.

Here, the image determination unit 305 may determine whether the electrodes are abnormal in at least some of a plurality of preset categories in relation to the electrode arrangement such as misalignment of the electrodes, electrode omission, electrode duplication, and electrode deformation, etc.

Specifically, each of the deep learning-based determination model and the rule-based determination model may be configured to determine an abnormality in the electrodes of the specimen based on at least some of whether an electrode alignment is abnormal, whether an electrode is omitted, whether electrodes are duplicated, and whether an electrode is deformed in the acquired 3-dimensional image.

In addition, the determination of whether an electrode alignment is abnormal may be configured to perform according to: by using the deep learning-based determination model and the rule-based determination model, whether a gap between endpoints of two electrodes disposed in the 3-dimensional image is greater than a preset reference gap; whether a slope formed based on the endpoints of the two electrodes is greater than a preset reference slope; or whether an endpoint of one electrode from the 3-dimensional image is greater than a preset threshold distance from a preset reference point.

To describe in more detail, if the abnormality determination model 323 includes the first determination model 331 and the second determination model 333, the first determination model 331 and the second determination model 333 may be the same deep learning-based determination model, or may be different deep learning-based determination models.

Alternatively, one of the first determination model 331 and the second determination model 333 constituting the abnormality determination model 323 may be a deep learning-based determination model, and the other may be a rule-based determination model.

As described above, the image determination unit 305 may process tomography images on two planes which are different from each other, for example, perpendicular to each other, as an input to each of the determination models constituting the abnormality determination model 323, and from the tomography images, determine the electrode state (e.g., normal state or abnormal state) of the specimen 21 through the determination models based on at least some of the electrodes, the endpoints of each electrode, the polarity of adjacent electrodes, and the gap between the electrodes.

In step 1105, the electrode state determination unit 307 may detect an abnormality in electrodes of the specimen based on the determination results for each of one or more determination models.

As described above, the electrode state determination unit 307 may collect the determination results (electrode state determination results) acquired from each of one or more determination models constituting the abnormality determination model 323, and when all determination results are normal, determine that the electrodes of the specimen 21 are in a normal state On the other hand, when all determination results acquired from each of one or more determination models constituting the abnormality determination model 323 are abnormal, the electrode state determination unit 307 may determine that the electrodes of the specimen 21 are in an abnormal state.

In addition, when the determination results acquired from each of one or more determination models constituting the abnormality determination model 323 include both normal and abnormal states, the electrode state determination unit 307 may determine (reinspection) to perform again the abnormality (to perform a reinspection) on the electrodes of the specimen 21.

When all abnormality determination results of reinspection are normal, the electrode state determination unit 307 may determine that the electrodes of the specimen 21 are in a normal state, and when at least one abnormality determination result is abnormal, determine that the electrodes of the specimen 21 are in an abnormal state.

When it is determined that the electrodes of the specimen 21 are in an abnormal state, as described above, the electrode state determination unit 307 may acquire information on the cause for the abnormal state of the specimen. For example, the electrode state determination unit 307 may acquire information on the category to which the abnormality in electrodes of the specimen 21 corresponds, the electrode in which the abnormality occurred, and the state of the electrode in which the abnormality occurred, and may acquire at least one tomography image used to determine the abnormality in electrodes.

In addition, the electrode state determination unit 307 may set a label on at least one tomography image used to determine abnormality in electrodes based on the acquired information. For example, the electrode state determination unit 307 may display electrodes in an abnormal state as a boundary box in the tomography image.

The electrode state determination unit 307 may output a notification about an abnormality of the specimen 21, or transmit a notification about the abnormality of the specimen 21 and at least one tomography image labeled with the abnormality in electrodes to a preset device.

When performing of step 1105 is completed, the processing unit 110 may end the procedures of the embodiment in FIG. 11.

In addition, according to various embodiments, the electrode state determination unit 307 may process so that the specimen 21 that has been determined to be in the abnormal state is discharged from a battery production process.

According to various embodiments, it is possible to improve the performance of detecting whether electrodes of the specimen are abnormal by providing a device which determines the electrode state of the specimen using tomography images obtained by imaging cut surfaces at various angles with respect to the electrodes of the specimen.

According to various embodiments, it is possible to improve the reliability of the determination model which determines whether the electrodes of the specimen are abnormal by providing an abnormality determination model for a specimen including a plurality of determination models, in such a way that the same deep learning-based determination models are configured in parallel, or the deep learning-based determination model and the rule-based determination model are configured in parallel, and a device based thereon.

According to various embodiments, it is possible to improve the speed and accuracy of determining an abnormality in electrodes of the specimen by providing a device for determining an abnormality in electrodes of a specimen using the plurality of determination models, and thus to reduce the consumption of materials used for defective batteries. Further, it is possible to reduce the manpower required to maintain the production quality of the battery.

According to the detailed description above, the functions of various embodiments described as being performed by the device 100 are operations processed through the processing unit 110 of the device 100, and may be performed by organically being connected to the device 100 and/or components of the device connected to the device 100.

As described above, although the embodiments have been described with reference to the limited drawings, it will be apparent to those skilled in the art that various modifications and alternations may be applied thereto based on the various embodiments.

For example, adequate effects may be achieved even if the foregoing processes and methods are carried out in different order than those described above, and/or the above-described elements, such as systems, structures, devices, or circuits, are combined or coupled in different forms and modes than those described above, or substituted or switched with other components or equivalents.

In particular, when describing with reference to the flowchart, it has been described that a plurality of steps are configured and the steps are sequentially executed in a designated order, but it is not necessarily limited to the designated order.

In other words, executing by changing or deleting at least some of the steps described in the flowchart or adding at least one step is applicable as an embodiment, and executing one or more steps in parallel may also be applicable as an embodiment. That is, it is not limited to that the steps are necessarily operated in a time-series order, and should be included in various embodiments of the present disclosure.

Therefore, other implements, other embodiments, and equivalents to claims are within the scope of claims to be describe below.

What is claimed is:

1. A method for detecting an abnormality in battery cell type electrodes, the method comprising:

acquiring a 3-dimensional image by imaging a specimen including one or more battery cell type electrodes;

determining an arrangement state of the electrodes of the specimen by processing the 3-dimensional image as an input to one or more determination models comprising a deep learning-based determination model or a rule-based determination model; and detecting an abnormality in the electrodes of the specimen based on determination results for each of one or more determination models, wherein the one or more determination models is configured to extract electrodes from a plurality of tomography images included in the 3-dimensional image, extract endpoint positions for each of the extracted electrodes, and determine the arrangement state of the electrodes based on endpoint positions of pairs of electrodes, and wherein the arrangement state includes at least one of whether an electrode alignment is abnormal, whether an electrode is omitted, whether electrodes are duplicated, and whether an electrode is deformed.

2. The method according to claim 1, wherein in the acquiring a 3-dimensional image, the 3-dimensional image is generated by integrating a plurality of images, which are obtained by tomography of cross-sections of the electrodes inside the specimen in a specific region of edges of the specimen, where the electrodes are disposed, by means of CT.

3. The method according to claim 2, wherein the specific region includes a region where an extension line of a first edge formed in a first axis direction and an extension line of a second edge formed in a second axis direction of the specimen meet, and the plurality of images include a first tomography image obtained by tomography of a first cross-section of the specimen perpendicular to the first edge in the specific region, and a second tomography image obtained by tomography of a second cross-section of the specimen perpendicular to the second edge in the specific region.

4. The method according to claim 1, wherein in the detecting an abnormality in the electrodes, each of the deep learning-based determination model and the rule-based determination model is configured to determine an abnormality in the electrodes of the specimen based on at least some of whether the electrode alignment is abnormal, whether the electrode is omitted, whether the electrodes are duplicated, and whether the electrode is deformed in the acquired 3-dimensional image.

5. The method according to claim 4, wherein the determination of whether an electrode alignment is abnormal is configured to perform according to:

in the determining an arrangement state of the electrodes, by using the deep learning-based determination model and the rule-based determination model, whether a gap between endpoints of two electrodes disposed in the 3-dimensional image is greater than a preset reference gap; whether a slope formed based on the endpoints of the two electrodes is greater than a preset reference slope; or whether an endpoint of one electrode from the 3-dimensional image is greater than a preset threshold distance from a preset reference point.

6. The method according to claim 1, wherein the one or more determination models comprise:

i) two or more of the same deep learning-based determination models;

ii) two or more different deep learning-based determination models; or iii) at least one of the deep learning-based determination model and at least one rule-based determination model.

7. A device for detecting an abnormality in battery cell type electrodes, the device comprising:

an image acquisition apparatus configured to acquire a 3-dimensional image by imaging a specimen including one or more battery cell type electrodes;

an image determination apparatus configured to determine an arrangement state of the electrodes of the specimen by processing the 3-dimensional image as an input to one or more determination models comprising a deep learning-based determination model or a rule-based determination model; and an electrode state determination apparatus configured to detect an abnormality in the electrodes of the specimen based on determination results for each of one or more determination models, wherein the one or more determination models is configured to extract electrodes from a plurality of tomography images included in the 3-dimensional image, extract endpoint positions for each of the extracted electrodes, and determine the arrangement state of the electrodes based on endpoint positions of pairs of electrodes, and wherein the arrangement state includes at least one of whether an electrode alignment is abnormal, whether an electrode is omitted, whether electrodes are duplicated, and whether an electrode is deformed.

8. The device according to claim 7, wherein the image acquisition apparatus generates the 3-dimensional image by integrating a plurality of images, which are obtained by tomography of cross-sections of the electrodes inside the specimen in a specific region of edges of the specimen, where the electrodes are disposed, by means of CT.

9. The device according to claim 8, wherein the specific region includes a region where an extension line of a first edge formed in a first axis direction and an extension line of a second edge formed in a second axis direction of the specimen meet, and the image acquisition apparatus acquires the plurality of images including a first tomography image obtained by tomography of a first cross-section of the specimen perpendicular to the first edge in the specific region, and a second tomography image obtained by tomography of a second cross-section of the specimen perpendicular to the second edge in the specific region.

10. The device according to claim 7, wherein each of the deep learning-based determination model and the rule-based determination model is configured to determine an abnormality in the electrodes of the specimen based on at least some of whether the electrode alignment is abnormal, whether the electrode is omitted, whether the electrodes are duplicated, and whether the electrode is deformed in the acquired 3-dimensional image.

11. The device according to claim 10, wherein the image determination apparatus determines whether the electrode alignment is abnormal according to: by using the deep learning-based determination model and the rule-based determination model, whether a gap between endpoints of two electrodes disposed in the 3-dimensional image is greater than a preset reference gap; whether a slope formed based on the endpoints of the two electrodes is greater than a preset reference slope; or whether an endpoint of one electrode from the 3-dimensional image is greater than a preset threshold distance from a preset reference point.

12. The device according to claim 7, wherein the one or more determination models comprises:

i) two or more of the same deep learning-based determination models;

ii) two or more different deep learning-based determination models; or iii) at least one of the deep learning-based determination model and at least one rule-based determination model.

* * * * *